United States Patent
Appelberg

(10) Patent No.: US 8,699,246 B2
(45) Date of Patent: Apr. 15, 2014

(54) SWITCH MODE CONVERTER AND A METHOD OF STARTING A SWITCH MODE CONVERTER

(75) Inventor: Mikael Appelberg, Göteborg (SE)

(73) Assignee: Optis Wireless Technology, LLC, Plano, TX (US)

( * ) Notice: Subject to any disclaimer, the term of this patent is extended or adjusted under 35 U.S.C. 154(b) by 221 days.

(21) Appl. No.: 12/997,583

(22) PCT Filed: Jun. 5, 2009

(86) PCT No.: PCT/SE2009/050677
§ 371 (c)(1),
(2), (4) Date: Mar. 23, 2011

(87) PCT Pub. No.: WO2009/154545
PCT Pub. Date: Dec. 23, 2009

(65) Prior Publication Data
US 2011/0164438 A1    Jul. 7, 2011

Related U.S. Application Data

(60) Provisional application No. 61/073,378, filed on Jun. 18, 2008.

(51) Int. Cl.
*H02M 3/335* (2006.01)

(52) U.S. Cl.
USPC .......................................... 363/49; 323/901

(58) Field of Classification Search
USPC ......... 323/214, 215, 219, 222, 223, 224, 225, 323/232, 282, 300, 301, 311, 363, 370, 323/901; 363/15, 16, 17, 49, 21.06, 21.14, 363/127
See application file for complete search history.

(56) References Cited

U.S. PATENT DOCUMENTS

| 6,091,234 A * | 7/2000 | Kitagawa .................. 323/244 |
| 6,618,274 B2 * | 9/2003 | Boylan et al. ................ 363/17 |

(Continued)

FOREIGN PATENT DOCUMENTS

| WO | 2006/076642 A2 | 7/2006 |
| WO | 2007/061369 A1 | 5/2007 |
| WO | 2008/013871 A1 | 1/2008 |

OTHER PUBLICATIONS

PCT International Search Report, dated Oct. 6, 2009, in connection with International Application No. PCT/SE20091050677.

(Continued)

*Primary Examiner* — Gary L Laxton
*Assistant Examiner* — Alex Torres-Rivera
(74) *Attorney, Agent, or Firm* — Carstens & Cahoon, LLP; Vincent J. Allen

(57) ABSTRACT

For a more stable start-up procedure, a switch mode power converter has at least one inductive component including an output inductor L1 and a synchronous rectification element, said power converter comprising a control device and being characterized in that the control device is arranged, at startup of the power converter, to determine a duty-cycle of the control signal, including a normal pulse width of the control pulse, and provide an initial control signal to the at least one switch element that is designed to balance the current in the at least one inductive component of the converter. The initial control signal preferably has a duration of 50% of the normal pulse width.

6 Claims, 4 Drawing Sheets

(56) References Cited

U.S. PATENT DOCUMENTS

| | | | |
|---|---|---|---|
| 6,657,399 B2 * | 12/2003 | Adams et al. | 315/224 |
| 6,760,235 B2 * | 7/2004 | Lin et al. | 363/21.06 |
| 7,158,394 B2 * | 1/2007 | Takahashi et al. | 363/49 |
| 7,423,888 B2 * | 9/2008 | Shao et al. | 363/21.04 |
| 7,834,601 B2 * | 11/2010 | Aiura et al. | 323/266 |
| 2004/0130922 A1 | 7/2004 | Perry et al. | |
| 2005/0017702 A1 * | 1/2005 | Kernahan et al. | 323/282 |
| 2005/0212500 A1 | 9/2005 | Bucheru | |
| 2007/0115703 A1 | 5/2007 | Liu et al. | |
| 2007/0127276 A1 * | 6/2007 | Yoshimatsu et al. | 363/49 |
| 2007/0211499 A1 * | 9/2007 | Fukumoto | 363/21.09 |
| 2012/0212160 A1 * | 8/2012 | Shindo et al. | 318/139 |

OTHER PUBLICATIONS

PCT Written Opinion, dated Oct. 6, 2009, in connection with International Application No. PCT/SE2009/050677.

International Preliminary Report on Patentability, dated Jun. 1, 2010, in connection with International Application No. PCT/SE2009/050677.

* cited by examiner

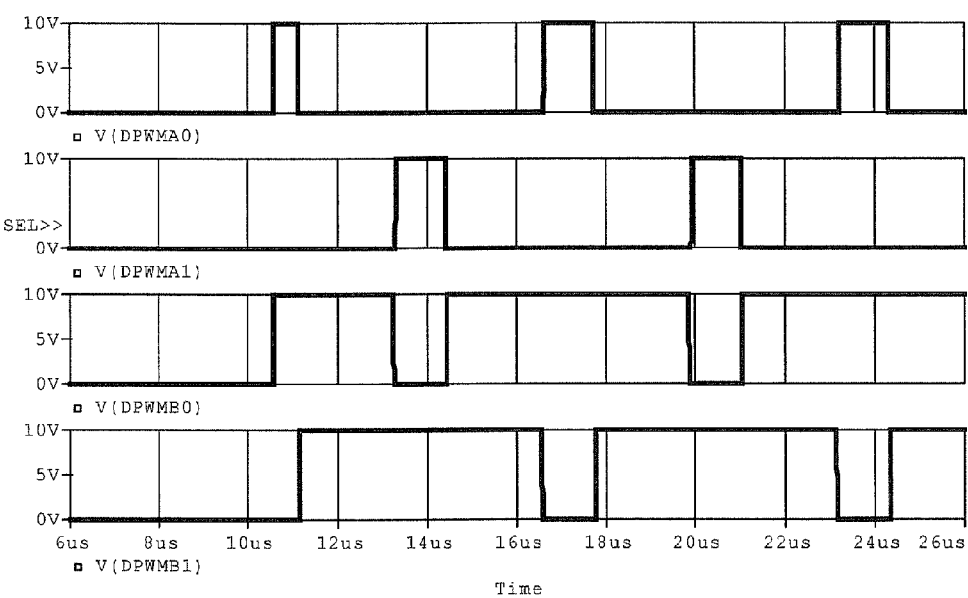

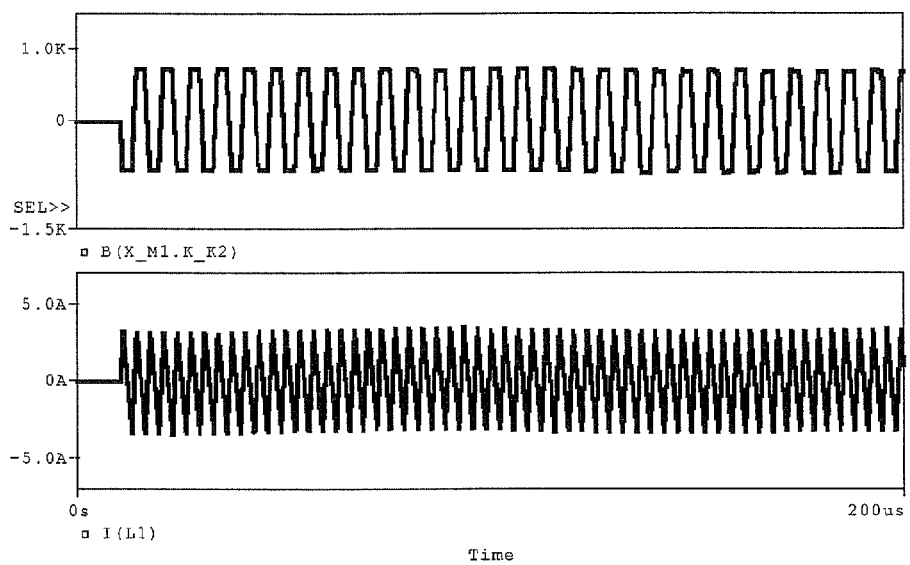
Fig. 4a
Fig. 4b
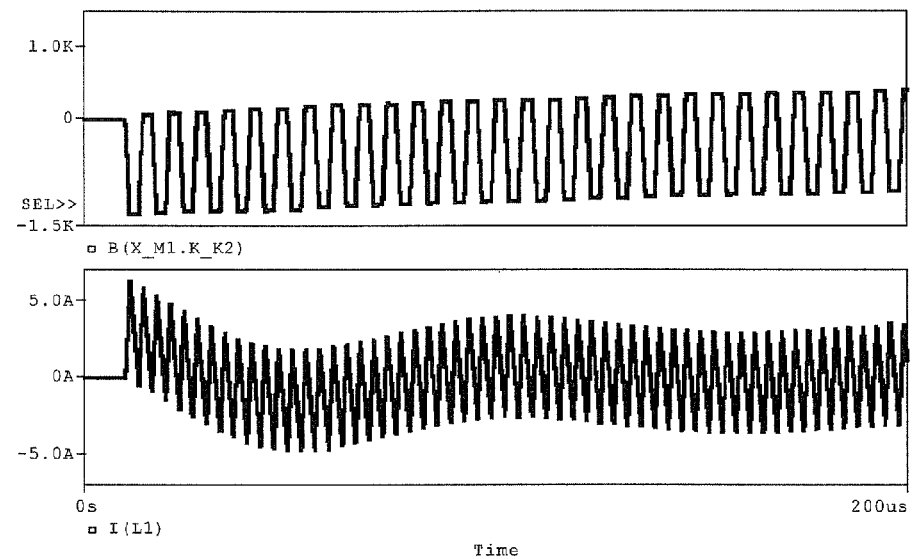
Fig. 5a
Fig. 5b

SWITCH MODE CONVERTER AND A METHOD OF STARTING A SWITCH MODE CONVERTER

CROSS-REFERENCE TO RELATED APPLICATIONS

This application claims priority under 35 U.S.C. §119 to U.S. Provisional Patent Application No. 61/073,378, filed Jun. 18, 2008, which is hereby incorporated herein by reference in its entirety.

TECHNICAL FIELD

The present invention relates to a switch mode converter having direct energy transfer topology and a method of starting such a switch mode converter.

BACKGROUND

To increase the efficiency of switch mode converters the secondary side rectification element has gradually been changed from diodes to mosfets (synchronous rectification). This increases the efficiency of the converter and improves the dynamic performance. A mosfet used as a rectification element, where traditionally a diode would be used, is referred to as a synchronous mosfet. The mosfet is turned on when the diode was supposed to conduct. The use of a mosfet as a rectifying element reduces the losses significantly in high current applications.

One drawback, during start-up, is the capability of a mosfet to send currents in both directions. This is a problem if the output of the converter already is biased (a voltage exists on the output) when the converter starts up. If this is not taken into account during startup the output will be pulled to a level dictated by the internal reference, which can damage attached devices. To avoid this, the reference must be set up to a value corresponding to the output, or the start of the converter must be delayed until the reference has reached the correct value. Typical solutions to this problem involve gradual start-up of the synchronous rectifiers by ramping-up the gate voltage to achieve the desired performance. Such a solution is proposed, for example in International Patent Publication No. WO 2007/061369.

The above drawback is addressed, for example, in International Patent Publication No. WO 2006/076642. This document proposes a solution how to start up against an existing voltage below the nominal output on the output of the converter. The duty cycle of the power supply is determined by measuring the input and output voltages and delaying the turn-on until the reference voltage matches the output voltage.

U.S. 2005/0212500 A1 also addresses this problem.

SUMMARY OF THE INVENTION

In view of the above, it is an object of the invention to provide an improved start-up procedure for the converter, and a converter capable of performing such an improved start-up procedure.

This object is achieved according to the invention by a switch mode power converter as defined in claim 1 and a method of starting up a switch mode power converter having the features of claim 4.

The basic concept of the invention is to start the converter with a correct pre-calculated duty-cycle and an initial pulse train which balances the current in the inductive components.

Hence, embodiments of the invention relate to the initiation method of the converter, which balances the (removes the offset in the inductive components) the inductive components. The principle is simple. After the duty cycle is calculated the internal reference and the output of the error amplifier is set to a value corresponding to the calculated duty cycle, the converter starts up, the first pulse is reduced, preferably to substantially 50% of the original width.

By applying this technique the synchronous mosfets used as rectification elements can be turned on directly, without any gradual ramp-up of the gate voltage. If the input and output voltage readings are accurate no transient will occur, nor will there be any oscillations between the internal inductive components and the output capacitors. With the inventive solution, a microprocessor implementation completely removes the need for analogue nets which delays the turn on of the synchronous mosfets, rapidly charges the reference or similar. The converter can also be configured to start up against voltages higher than the configured output voltage. During this condition the voltage will be regulated down to the configured output with a pre-defined slewrate. This simplifies the implementation, and reduces the required board area and the cost.

This is in contrast to many known solutions to the problem, which are devised in the analog domain. Designing a solution in the analogue domain can usually give adequate performance but often requires fairly complex start-up nets to achieve this (the more complex the net the better the startup). Nor do they take the initial magnetization of the inductive components into account. The introduction of digital controllers simplifies this significantly.

BRIEF DESCRIPTION OF THE DRAWINGS

FIGS. 3*a*-3*d* illustrate the effect of control signals according to an embodiment of the invention applied to the converter of FIG. 1

FIGS. 4*a* and 4*b* illustrate the effect of the magnetization current on the transformer of the power converter when control signals according to an embodiment of the invention are applied.

FIGS. 5*a* and 5*b* illustrate the effect of the magnetization current on the transformer of the power converter when control signals according to the prior art are applied.

DETAILED DESCRIPTION

Figure 1:
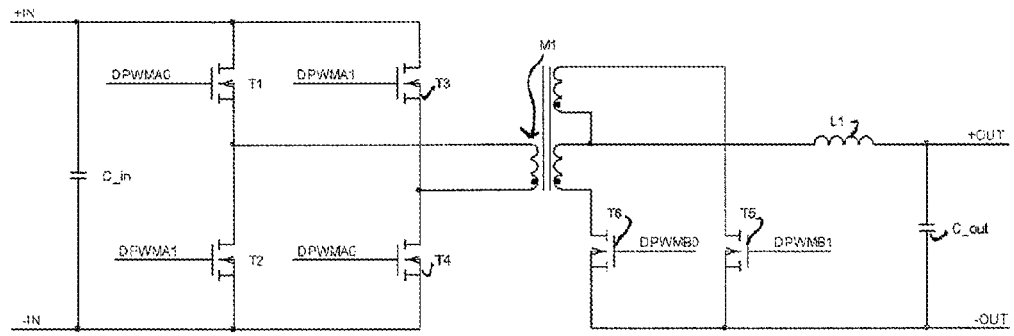
FIG. 1 illustrates a power converter in which the inventive method can be applied.

FIG. 1 illustrates a hard switched full bridge converter. The converter comprises a transformer M1 having a primary side including a primary winding and a secondary side including a secondary winding. On the primary winding a first and a second switch elements in the form of mosfets T1, T2 are interconnected by the drain of the second switch element T2 and the source of the first switch element T1. The interconnected source and drain are connected to one end of the primary winding. Third and fourth switch elements T3, T4 are interconnected by the drain of the fourth switch element T4 and the source of the third switch element and the interconnected source and drain are connected to the other end of the primary. The drains of the first T1 and third T3 switch elements are interconnected and the sources of the second T2 and fourth T4 switch elements are interconnected. Between the interconnected sources and the interconnected drains the input voltage is applied. The control signal DPWMA0 controls T1 and T4, and the control signal DPWMA1 controls T2 and T3. The described bridge connection produces a balanced pulse width modulated push-pull signal over the transformer M1.

On the secondary side a fifth mosfet T5 is connected by its drain to one end of the secondary winding. The source of the fifth mosfet T5 is connected to a negative output voltage −OUT. A voltage source is connected between ground and the gate of the fifth mosfet providing a control signal DPWMB1 to the gate of T5.

To the other end of the secondary winding a sixth mosfet T6 is connected by its drain. The source of the sixth mosfet T6 is connected to the negative output voltage −OUT. A voltage source is connected between ground and the gate of the sixth mosfet providing a control signal DPWMB0 to the gate of T6.

The described bridge produces a pulse width modulated signal between the negative output voltage −OUT and the centre tap of the secondary winding. This signal is averaged to DC by a first inductor L1 and a first capacitor Cout which generates an output voltage between the positive output terminal +OUT and the negative output terminal −OUT.

According to the invention a microprocessor is used to control the control voltages DPWMA0, DPWMA1, DPWMB0 and DPWMB1.

Although the example converter shown in FIG. 1 is a hard switched full bridge converter, it should be understood that the inventive principle can be applied to any type of converter having a direct energy transfer topology, including but not limited to forward, bridge, buck and push-pull converters.

Figures 2A, 2B, 2C, 2D:
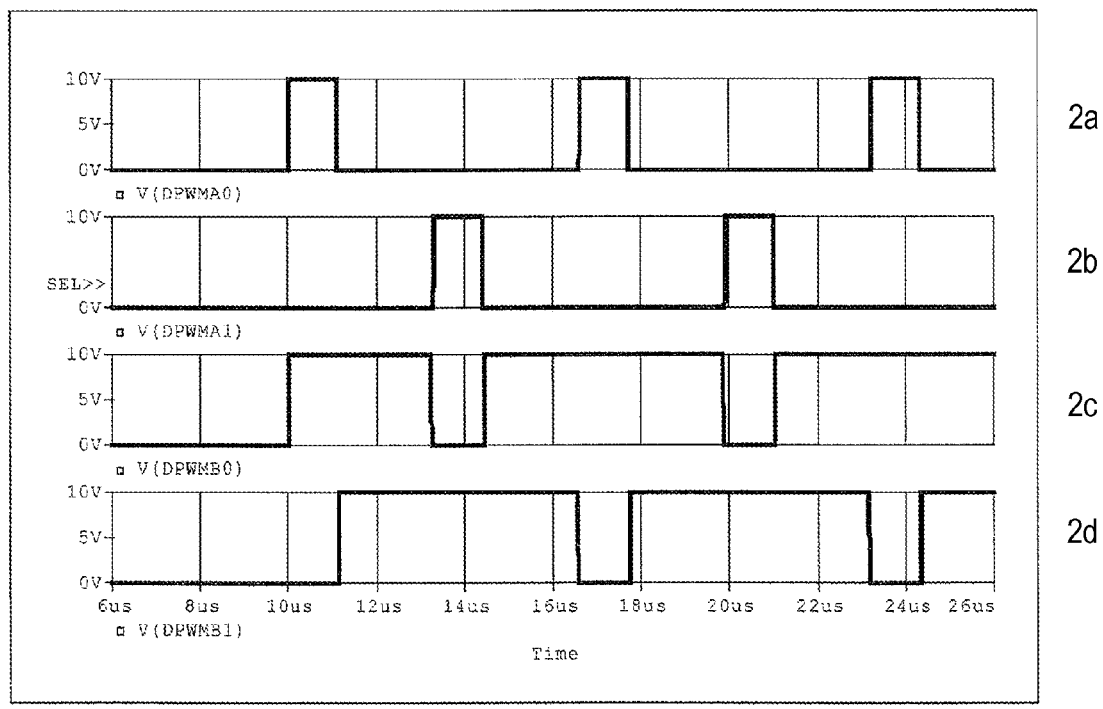
FIGS. 2*a*-2*d* illustrate the effect of prior art control signals applied to the converter shown in FIG. 1

According to an embodiment of the invention, the rising edges of the first and third control signals DPWMA0 and DPWMB0 are modified to remove the offset in the inductive components. This is illustrated in FIGS. 2a-2d and 3a-3d. FIG. 2a illustrates the first control signal PWDMA0 during normal operation and FIG. 3a illustrates the first control signal PWDMA0 during a start-up according to an embodiment of the invention. As can be seen, the control signals are identical apart from the first pulse at startup. In FIG. 2a the first pulse has the same pulse width and timing as the following pulses, whereas in FIG. 3a a reduced "half-pulse" is applied having its rising edge in the middle of the normal operation pulse. The reduced first pulse does not have to be exactly the second half of the normal operation pulse that it replaces. It could be placed at any position in time within the time of this pulse, as long as it covers 50% of the normal pulse.

FIGS. 2b and 3b illustrates the second control signal DPWMA1 according to the prior art and according to the invention, respectively. As can be seen, according to the present embodiment, this signal is not modified, that is, the signal are identical in FIGS. 2b and 3b.

FIGS. 2c and 3c illustrate the third control signal DPWMB0 used to control the sixth mosfet T6. As can be seen, the signal is modified so that in FIG. 3c the second rectification element T6 only conducts during the on-time of the first T1 and fourth T4 switch elements, that is, when the first control signal DPWMA0 is high.

FIGS. 2d and 3d illustrate the fourth control signal DPWMB1 used to control the fifth mosfet according to the prior art and according to the invention, respectively. As can be seen, according to the present embodiment, this signal is not modified.

The effect on the magnetization current in the transformer M1 and the ripple current in the inductor L1 when the inventive start-up pulse-train is applied, in which the first pulse only has half the pulse width, can be seen in FIGS. 4a and 4b, respectively. The desired current waveform is a signal with an average of zero but with an amplitude of Irippel, having minimum and maximum amplitudes of Irippel/2 and −Irippel/2, respectively. The first pulse will, if not compensated, generate a positive or negative amplitude of Irippel. This will correspond to an offset of Irippel/2

The effect on the magnetization current in the transformer M1 and the ripple current in the inductor L1 when the normal pulse-train is applied at start-up, can be seen in FIGS. 5a and 5b, respectively. As can be seen, during normal startup both the inductor and the transformer get an initial offset equaling half the ripple amplitude and only attain the stable, desired values after a period of time.

Figure 6A:
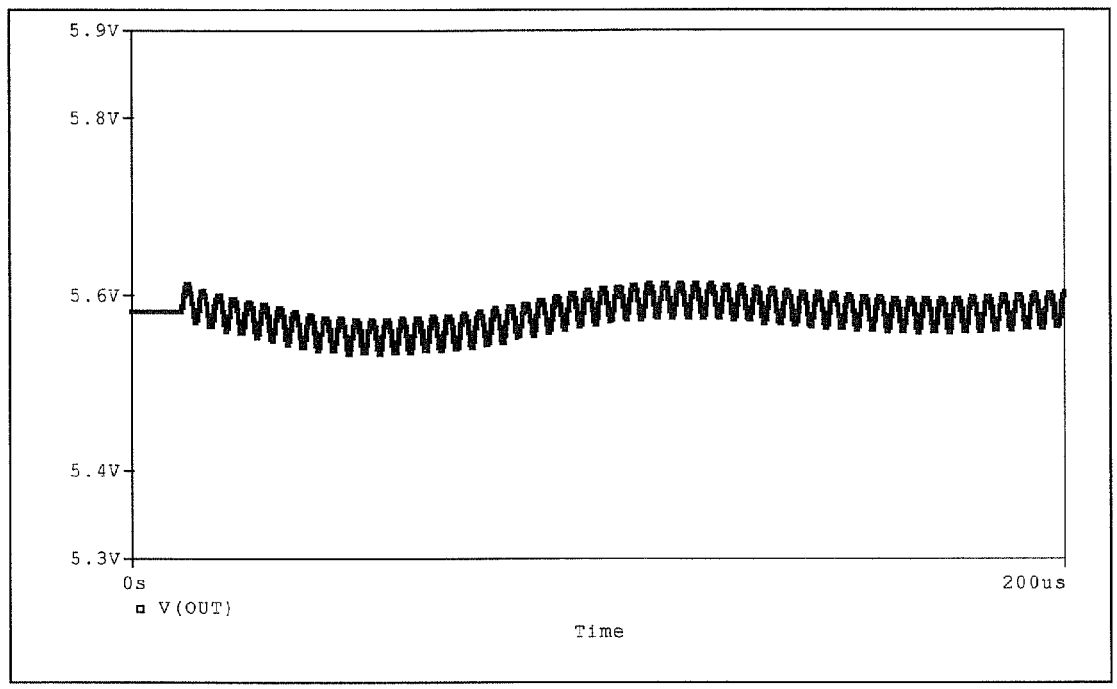
FIGS. 6*a* and 6*b* illustrate effect of the inventive start-up procedure on the output voltage.
Figure 6B:
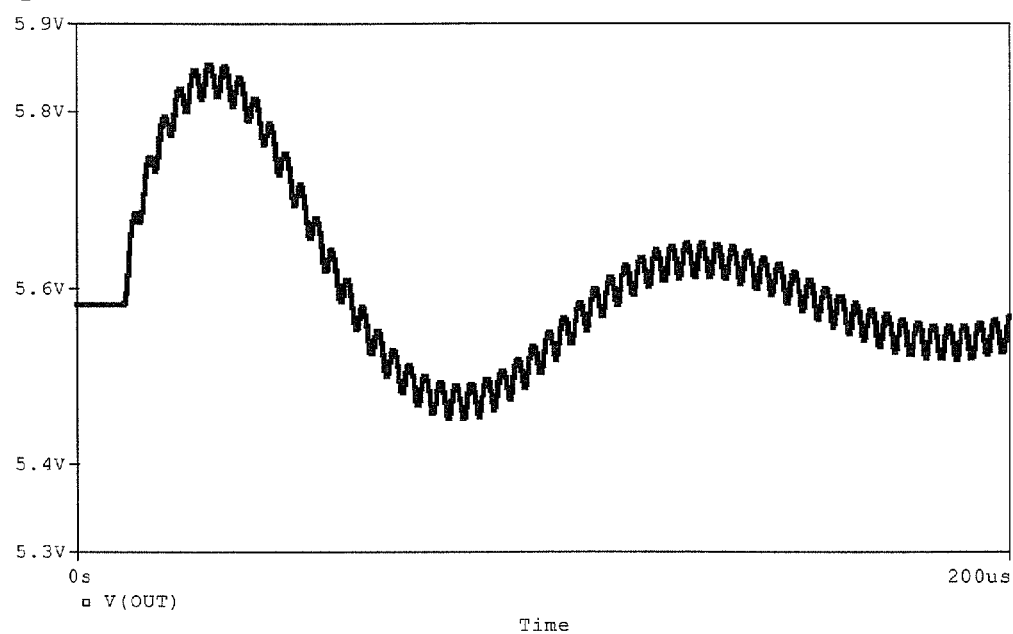

FIG. 6a shows the effect on the output voltage at startup when pulse-train according to the invention is applied at startup, and FIG. 6b shows the output voltage at normal startup without the half-pulse reduction. In the case shown in FIG. 6b, a 250 mV overshoot occurs. As can be seen in FIG. 6a, the half-pulse reduction according to an embodiment of the invention results in an output voltage with no oscillation or overshoots.

A method according to an embodiment of the invention therefore comprises the following steps:

First the microprocessor calculates the duty cycle of the converter.

Then the converter is started by applying control pulse trains DPWMA0 and DPWMA1. The first pulse of the first pulse train DPWMA0 has a reduced width compared to the normal pulse of the pulse train. All subsequence pulses have the normal width. The reduced width is preferably 50% or substantially 50% of the normal pulse width and is preferably achieved by delaying the rising edge of the pulse.

The invention claimed is:

1. A switch mode power converter having at least one inductive component including an output inductor and at least one synchronous rectification element, each said at least one synchronous rectification element configured to operate as a switch element, said power converter comprising a control device, wherein the control device is arranged, at initiation of startup of the power converter, to determine a duty-cycle of a startup control signal, including a normal pulse width of plural control pulses and a reduced pulse width of a first control pulse, and to provide the startup control signal to the at least one switch element, wherein during initiation of startup of the switch mode power converter the first control pulse has the reduced pulse width while all subsequent pulses are the plural control pulses of the startup control signal having same normal pulse width, such that current in the at least one inductive component of the converter is balanced.

2. A power converter according to claim 1, wherein the control device is arranged to provide the startup control signal comprising the first control pulse after initiation of startup that has a reduced pulse width by 50% compared to the normal pulse width.

3. A power converter according to claim 1, wherein the control device is arranged to calculate the duty-cycle of the startup control signal at startup of the converter.

4. A method of starting up a switch mode power converter having at least one inductive component and having at least one synchronous rectifying element, each said at least one synchronous rectification element configured to operate as a switch element, said method comprising the steps of:

determining a duty-cycle of a startup control signal, including a normal pulse width of plural control pulses and a reduced pulse width of a first control pulse; and providing the startup control signal to the at least one switch element, by reducing the pulse width of a first control pulse during initiation of startup of the switch mode power converter while maintaining same normal pulse width for all subsequent plural control pulses, such that current in the at least one inductive component of the converter is balanced.

5. A method according to claim 4, comprising the step of providing the startup control signal with the first control pulse after initiation of startup that has a reduced pulse width by 50% compared to the normal pulse width.

6. A method according to claim 4, comprising the step of calculating the duty-cycle of the startup control signal at startup of the converter.

* * * * *